Patented Jan. 30, 1945

2,368,484

UNITED STATES PATENT OFFICE 2,368,484

PROCESS FOR THE TREATMENT OF ALIPHATIC SULPHONIC ACIDS

Henry O. Mottern, Hillside, N. J., assignor to Standard Oil Development Company, a corporation of Delaware No Drawing. Application January 3, 1942, Serial No. 425,542

4 Claims. (Cl. 260—666)

The present invention relates to a process for the treatment of aliphatic sulphonic acids and hydroxy-sulphonic acids as found in dilute acid solutions, particularly those dilute acid solutions which are obtained as a residue from a prior process in which alkyl acid esters are hydrolyzed and distilled to yield olefin hydration products, in a manner to convert the sulphonic acids and hydroxy-sulphonic acids to normally liquid hydrocarbons.

Olefin hydration processes, in brief, consist in the absorption of olefin in 60–98% sulphuric acid, or phosphoric acid, which forms an extract of alkyl acid esters. The concentrated extract is then diluted with water to an acid concentration of 35–50% acid strength on an olefin-free basis, hydrolyzed and steam stripped to recover the alcohol. Such a process is particularly applicable to the manufacture of secondary aliphatic alcohols although it is also used in preparing tertiary alcohols. The residue from the distillation step is a weak acid, commonly designated as slop acid, which contains a mixture of sulphonic acid and hydroxy-sulphonic acid which were formed during the absorption and distillation steps in a concentration represented as .5 wt. %–2.5 wt. % of carbon based on the 100% $H_2SO_4$ content of the weak acid. The acid concentration of the slop acid, on an alcohol-free basis, usually falls within the range of from 35–50%. The S—C linkage of the sulphonic acid compounds is much more stable than the S—O—C linkage of the alkyl sulphates which results in the sulphonic acid compounds passing through the hydration and distillation steps of the olefin hydration process unchanged. Since the sulphonic acid compounds remain unchanged, their presence in the slop acid represents a reduction in yield of olefin hydration products. In the ordinary operation of an olefin hydration plant, this slop acid is then put through a recovery process in which it is first concentrated to an acid concentration of from 88–93% strength and then oxidized or bleached after which it is in condition for recycle to the olefin hydration process proper. The acid recovery process contains no provision for the recovery of the sulphonic acids or their derivatives by which useful material is lost. It is the purpose of this invention to convert these sulphonic acids, which are difficult to recover from dilute acid as such, to oils useful as fuel. The invention is not to be limited to the sulphonic acids formed in weak acid recovered from alcohol processes, but applies to all aliphatic sulphonic acids. The conditions of hydrolysis can be varied to suit the properties of the sulphonic acid to be hydrolyzed—as regards temperature, pressure, and time of hydrolysis.

The principal object of the present invention is the conversion of aliphatic or alicyclic sulphonic acids present in slop acid into useful compounds and products which are usually lost in the process of acid reconcentration. This and other objects of this invention will be apparent to those skilled in the art upon reading the following description:

According to the present invention, a residual acid solution or slop acid such as that obtained from an alcohol recovery process in which olefins have been hydrated to alcohols is heated to an elevated temperature under pressure for a period of from 1 to 3 hours and a normally liquid pressure distillate is taken off overhead. The process may be operated upon a continuous basis by adjusting the rate of feed of slop acid to the pressure still to compensate for the products taken overhead and the residual acid removed from the pressure vessel. The sulphonic acid compounds present in the slop acid conform to one of two general formulae which are:

$$R—SO_2OH \qquad R(OH)_xSO_2OH$$

in which R is an aliphatic hydrocarbon radical such as isopropyl, n-butyl, secondary-butyl, isobutyl, di-isobutyl, and tri-isobutyl, etc., and $x$ is a whole number from one to three. These compounds are formed during a process in which olefins are absorbed in various concentrations of sulphuric acid as a result of the reaction between a hydrocarbon and the sulphuric acid. They are relatively stable and pass through the step in which alkyl sulphuric acids are hydrated substantially unchanged.

In the practice of this invention, the acid contration of the slop acid on an alcohol-free basis is first adjusted to an acid concentration within a range of from 35 to 55%, preferably from about 45 to 50% acid concentration. The slop acid is then heated in a pressure still to a temperature of from 200° F. to 400° F., preferably in the proximity of 350° F., under pressures of from 25 to 160 lbs./sq. in. gauge, preferably from 45 to 65 lbs./sq. in. Under these conditions, the sulphonic acid compounds are converted to an oily material which is taken off overhead. The heating is continued for three hours although the most of the product distills over within the first hour and a half to two hours. The additional heating time is utilized to insure a maximum yield. In applying the process to slop acids recovered from processes manufacturing olefin-hydration products to control the rate of distillation within the range of from 4 wt. per cent to 8 wt. per cent per hour. In general, if the distillation rate is too slow, it provides opportunity for undesirable side reactions to occur, and if the distillation rate is too fast, a portion of the sulphonic acid compounds are distilled unchanged. The vapors from the pressure still are condensed yielding a normally liquid oily distillate which is useful as such as a fuel oil. It is preferred, however, to fractionate the oily distillate into more valuable products. The product is a fraction, about 20% by volume of the original oily distillate, boiling within the gasoline boiling range and having an octane number of about 100. Another fraction from 60 to 70% by volume of the original oily distillate consists of hydrocarbons and hydrocarbon polymers, and the remaining fraction, from 10 to 20% by volume of the oily distillate consists of higher alcohols and ketones which are useful as solvents and chemical intermediates.

The process of this invention is also applicable to the treatment of other petroleum oil refinery spent acids. In the process of refining petroleum oil, it is customary as one or more steps in the process to treat the oil or portions thereof with strong sulphuric acid. This treatment results in an acid sludge containing large amounts of tarry material and from 4 to 12% of water-soluble sulphonic acid. After the tarry material has been removed, the acid is known as weak acid and is then in condition for concentration to put it in condition for reuse. The ordinary reconcentrating processes destroy the sulphonic acid compounds present in the weak acid. However, if the weak acid is treated in the manner of the present invention, the sulphonic acid compounds are recovered as hydrocarbon material.

Sulphonic acid compounds, in general, can be converted to hydrocarbon materials by the process of this invention. This is accomplished by dissolving from 25 to 45 parts by volume of a sulphonic acid compound such as hydroxy octyl sulphonic acid in from 55 to 75 parts by volume of dilute sulphuric acid ranging in concentration from 35% to 55%. The solution of sulphonic acid compounds thus obtained is treated as described above except that the rate of distillation is adjusted to accommodate the larger volume of product obtained from the charge.

The following examples are given for the purpose of illustrating the invention:

Example 1

867 lbs. of slop acid recovered from a process for manufacturing butyl alcohol from butene containing 50.3% sulphuric acid on an alcohol-free basis was charged to a pressure still where it was heated for three hours at 350° F. under a pressure of from 45 to 67 lbs./sq. in. gauge. Distillate was taken overhead during the heating period at the rate of 1.35 gallons per hour and amounted to 2.67 lbs. The distillate was fractionated resulting in .534 lb. of a hydrocarbon fraction having an octane number of 100, 1.736 lbs. of a higher boiling hydrocarbon fraction, and .40 lb. of a high molecular weight alcohol and ketone fraction.

Example 2

853 lbs. of weak acid containing 46.5% sulphuric acid on an alcohol-free basis, recovered from the manufacture of isopropyl alcohol from propylene, was charged to a pressure still and distilled at 350° F. and 50–64 lbs./sq. in. pressure for a period of 3 hours. The distillate was taken over at a rate of 1.27 gallons per hour and amounted to .89 lb.

What is claimed is:

1. The process of converting alkyl sulphonic acids to hydrocarbons which comprises pressure distilling the residual solution of alkyl sulphonic acid in sulphuric acid from 35–55% acid concentration resulting from absorbing olefins in sulphuric acid of from 55–85% acid concentration, diluting the absorption product with water to an acid concentration below 55% and distilling to remove alcohol, at a temperature of from 200°–400° F., under pressures ranging from 25–160 lbs./sq. in. and removing the hydrocarbons as formed.

2. The process of converting alkyl sulphonic acids containing from 2 to 12 carbon atoms in the alkyl radical to hydrocarbons which comprises pressure distilling the residual solution of the alkyl sulphonic acids in sulphuric acid of from 35–55% acid concentration resulting from absorbing olefins in sulphuric acid of from 55–85% acid concentration, diluting the absorption product with water to an acid concentration below 55% and distilling to remove alcohol, at a temperature of from 200°–400° F., under pressures ranging from 25–160 lbs./sq. in., and removing the hydrocarbons as formed.

3. The process of converting octyl sulphonic acids to hydrocarbons which comprises pressure distilling the residual solution of octyl sulphonic acid in sulphuric acid of from 45–50% acid concentration resulting from absorbing olefins in sulphuric acid of from 55–85% acid concentration, diluting the absorption product with water to an acid concentration below 55% and distilling to remove alcohol, at a temperature of 350° F., under pressures ranging from 45–67 lbs./sq. in. for a period of 3 hours and removing the hydrocarbons as formed.

4. The process of converting hexyl sulphonic acids to hydrocarbons which comprises pressure distilling the residual solution of hexyl sulphonic acids in sulphuric acid of from 45–50% acid concentration resulting from absorbing olefins in sulphuric acid of from 55–85% acid concentration, diluting the absorption product with water to an acid concentration below 55% and distilling to remove alcohol, at a temperature of 350° F., under pressures ranging from 50–64 lbs./sq. in. for a period of 3 hours and removing the hydrocarbons as formed.

HENRY O. MOTTERN.